March 7, 1933.  F. HUND  1,900,061
ADVERTISING DEVICE
Filed Oct. 29, 1931   2 Sheets-Sheet 1

INVENTOR.
Franz Hund.
BY
Slough and Canfield
ATTORNEY.

March 7, 1933.  F. HUND  1,900,061
ADVERTISING DEVICE
Filed Oct. 29, 1931   2 Sheets-Sheet 2

INVENTOR.
Franz Hund.
BY
Slough and Canfield
ATTORNEY.

Patented Mar. 7, 1933

1,900,061

UNITED STATES PATENT OFFICE

FRANZ HUND, OF CLEVELAND, OHIO

ADVERTISING DEVICE

Application filed October 29, 1931. Serial No. 571,837.

This invention relates to advertising devices and particularly to advertising devices in the form of covers for automobile spare tires or wheels.

Attempts have been made heretofore to utilize the covering means of the spare tire or spare wheel carried on a motor car, as devices or carriers of advertising matter.

Such devices have heretofore had the objection that they can only be seen in the daytime or when momentarily illuminated by passing lamps.

It is therefore an object of this invention to provide an advertising cover for spare tires or wheels combined with an improved means for illuminating the same.

Another object is to provide an advertising tire for wheel covers which may be illuminated in a manner to render it inherently luminous whereby it not only may be read at night but whereby even in the day-time it attracts the eye and has advertising value by its luminous appearance.

Another object is to provide an illuminated advertising cover for tires or wheels which may be quickly and easily assembled with or disassembled from the tire or wheel when changing the latter.

Another object is to provide an advertising tire or wheel cover which may be manufactured as an accessory and applied to existing installations of spare wheel or spare tire and carrier or the like.

Another object is to provide, in an illuminated wheel or tire cover, an improved means for illuminating the same interiorly.

Other objects will be apparent to those skilled in the art to which my invention appertains.

My invention is fully disclosed in the following description taken in connection with the accompanying drawings, in which.

Figures 1, 4:
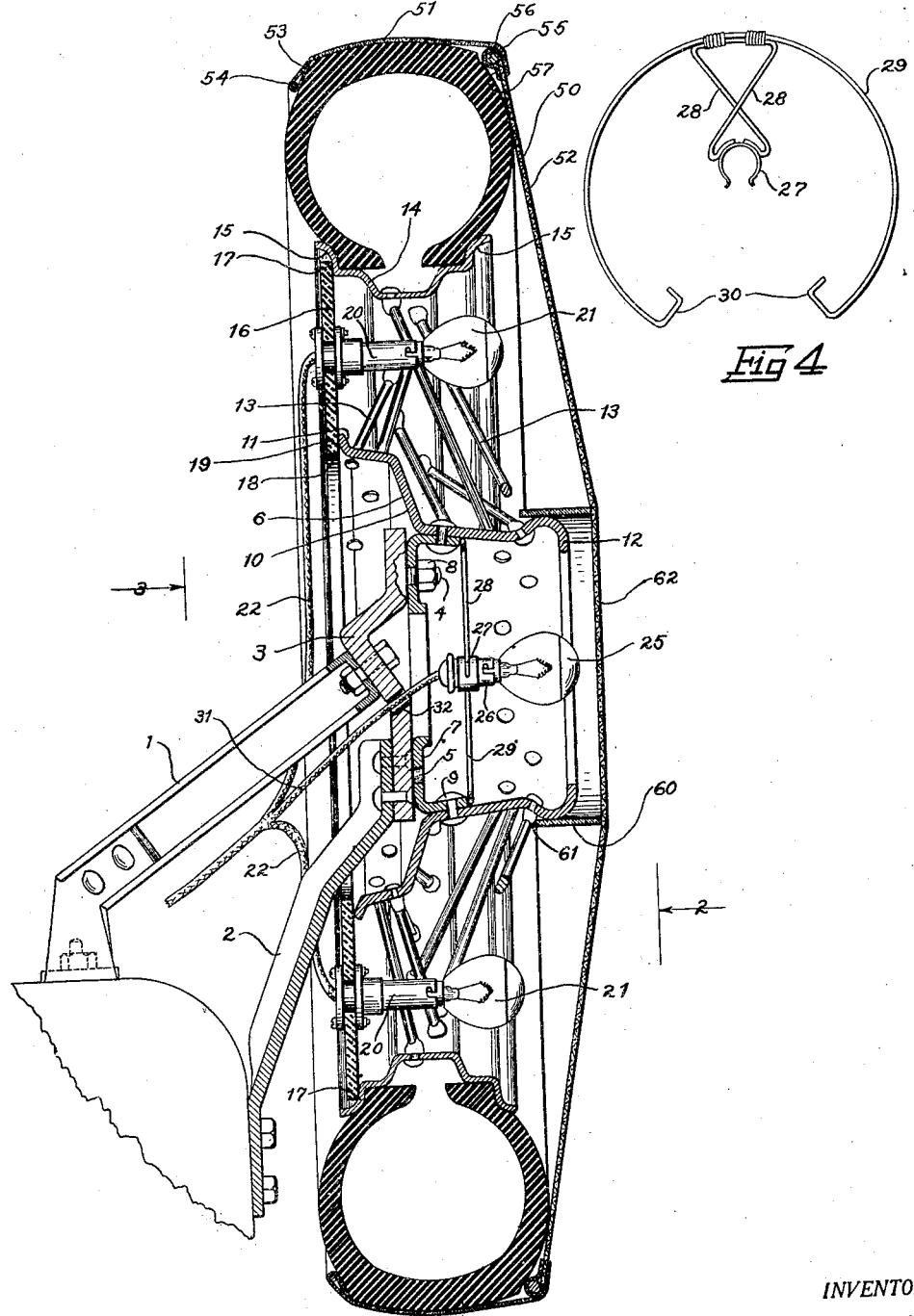
Fig. 1 is a cross-sectional view of a spare wheel, carrier therefor, and an embodiment of my invention associated therewith.
Fig. 4 is a view of one of the parts of Fig. 1 drawn separately, the view being taken approximately from the plane 2 of Fig. 1.
Figure 2:
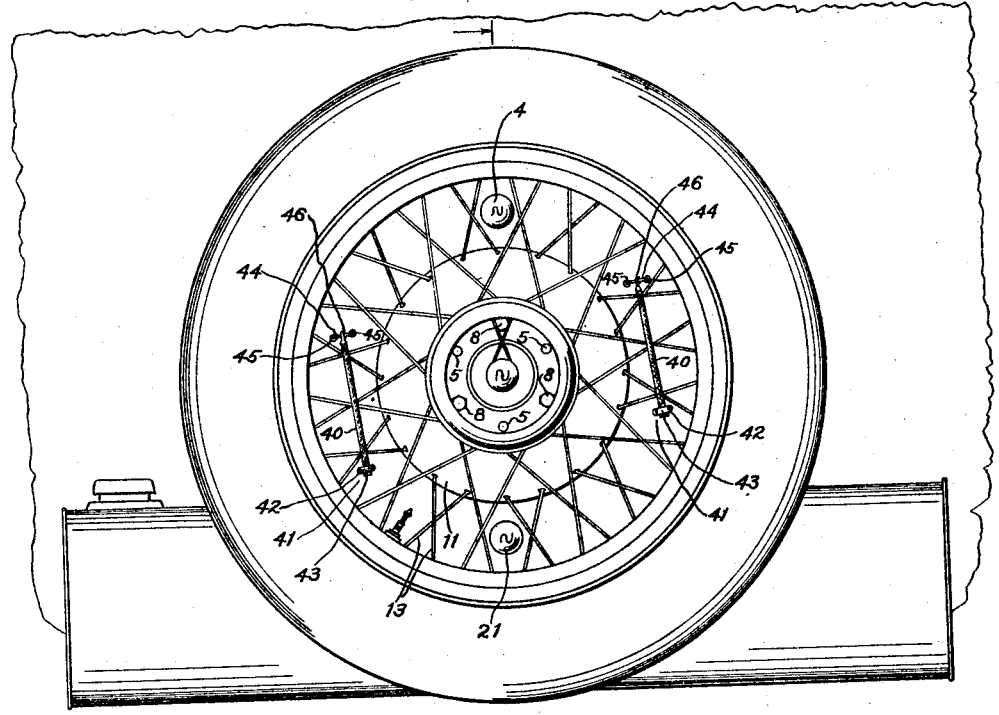
Fig. 2 is a view taken from the plane 2 of Fig. 1, drawn to a smaller scale, and with parts of the embodiment of my invention removed for illustrative purposes.
Figure 3:
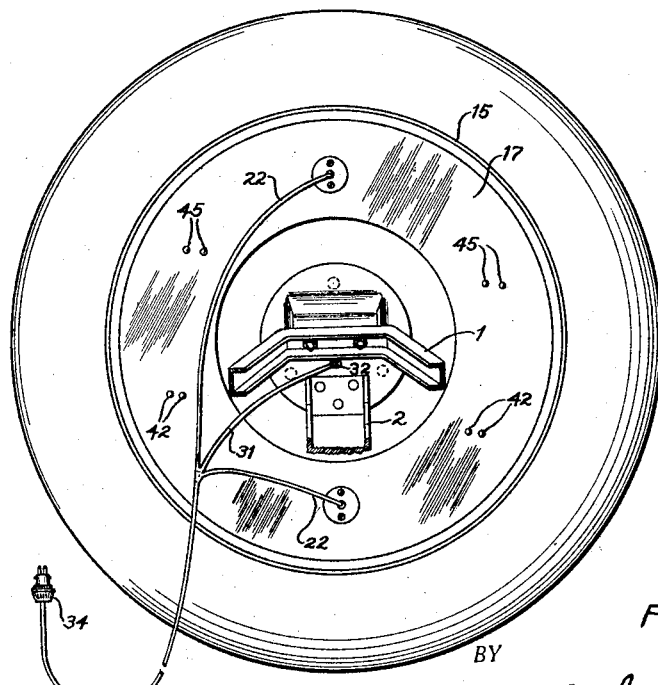
Fig. 3 is a view taken from the plane 3 of Fig. 1 and with parts broken away for clearness.

Referring to the drawings, I have shown at 1 and 2, brackets extending rearwardly from the rear end of a motor car, and having secured to their outer ends, a wheel-supporting head 3, provided with an annular row of studs 4, one only of which is shown in Fig. 1, the studs being adapted to register with and to telescopically receive a plurality of the usual perforations 5—5 in the hub construction of a spare wheel shown generally at 6, and plainly illustrated in Fig. 2. The perforations 5, in the particular type of wheel illustrated, are formed in a transverse flange 7. Nuts 8 are screwed onto the studs 4 to hold the flange 7 securely against the head 3. In Fig. 2, three such nuts are illustrated, and three perforations 5 are illustrated without studs, all of the perforations being employed in securing the wheel hub of the vehicle in its normal position of use when so employed.

The flange 7 is riveted as at 9 by a plurality of rivets to a hub 10 having a generally rearwardly extending annular portion 11 and a forwardly extending annular portion 12. Spokes 13—13 connect the hub 10 with the tire-supporting rim 14, the latter having casing-retaining bead portions 15—15.

The parts thus far described may be variously formed, but in general have been standardized and the illustration represents a characteristic form thereof.

At 16 I have shown an annulus of plate-like material such, for example, as insulating board of such outside diameter as to be suitably supportably lodged in the concavity of the casing bead 15 as at 17; and the central opening 18 of the annulus being of sufficient diameter as to encompass the brackets 1 and 2 without fouling thereon and of sufficiently small diameter that the annulus, adjacent the periphery of the central opening, may overlap, or may overlap and engage the annular termination of the hub portion 11 as at 19.

The annulus 16 supports a plurality, such as two or more, of lamp sockets 20—20 in which are mounted electric lamps 21—21. The sockets 20 may be secured to the rearward face of the annulus 16, and any suitable or well known construction may be employed whereby electric conductors 22—22 may conduct electric current through the annulus 16 to the lamp 21.

Within the hub portion 12, another lamp 25 is mounted, axially of the hub portion as follows. A socket 26 for the lamp is encircled by a resilient clip, 27, see Fig. 4, the clip being supported by pendent wire elements 28—28 secured at their upper ends to a circular spring 29 formed to expandingly retract to securely engage the inner wall of the hub portion 12. The free ends of the spring 29 are provided with hook portions 30—30 which may be seized by the fingers of an operator to contract the spring 29 and release it when it be desired to remove the same.

Current conducting cord 31 electrically connected to the socket 26, communicates with the interior of the hub portion 12 by way of a perforation 32 in the head 3 and joins the conductors 22—22 to form a single conductor 33 which terminates in a connection plug 34 adapted to be plugged into a conveniently located plug receptacle in the usual manner.

The annulus 16 is preferably resiliently maintained axially against the bead 15 by a pair of flexible resilient elements 40—40, see Fig. 2, permanently connected at one end as at 41—41 by rivets 42 and a bridging member 43, to the forward face of the annulus 16; and adapted to be threaded rearwardly through faces between adjacent spokes, and stretched over the spokes and at their free ends engaged with loops 44—44 secured to the rearward face of the annulus 16 by rivets 45—45, the free ends of the elements 40 being provided with hooks 46—46 for this purpose. The resilient elements 40 are preferably suitable lengths of rubber, covered with fabric as illustrated, but if desired may be fabric-covered helically wound springs; or the fabric covers may be omitted and bare springs employed.

At 50 is shown, generally, a wheel and tire cover. It comprises a tire tread covering portion 51 constructed from suitable fabric, leather or other suitable material of generally hollow cylindrical or tubular form in cross-section, and a generally circular side portion 52. The portion 15 forwardly is provided with a hem 53 in which is inserted a resiliently constricting annulus 54 formed from rubber, a helical spring or the like, adapted to inherently inwardly radially draw the said cover portion 51 down upon the tread and adapted to permit removal thereof by stretching the annulus 54 in a well known manner. The circular portion 52 is joined to the tread covering portion 51 as at 55 whereat a rigid annulus 56 formed from the steel wire or the like is disposed, secured to the inner or under side of the disc 52 as by an annular hem or the like 57 in the edge of the disc.

The disc 52 is constructed from light transmitting material, preferably translucent. Various materials and modes of treatment thereof may be employed to effect the desired degree of translucency, but in the preferred practice of my invention I employ fabric such as that employed to cover the wings of airplanes, one type of which is known to those skilled in the art as "flytex"; and upon this material I apply one or more coats of so-called "dope" such as is employed on fabric of airplane wings. This material and the described treatment thereof will produce a disc 50 which will, in connection with the annulus 56, draw itself by shrinking into a tight drumhead-like disc 52 without wrinkles or irregularities and will provide the translucent quality above referred to.

Any advertising legends or indicia may be painted upon the disc 52 either upon the outside or upon the inside thereof. When the lamps 21—21 and 25 are illuminated, the advertising matter, due to its opacity, will stand out clear against the translucent background of the disc 52 and present a pleasing as well as striking appearance. If desired, and as will be understood by those skilled in this art, advertising material may be disposed on the inner side of the disc 52 which will not appear to an outside observer except when the lamps are illuminated; whereas advertising material on the outside of the disc will be apparent both when the lamps are lighted and when they are extinguished.

In some cases I also provide a tubular element 60 disposed telescopically over the extreme end of the hub portion 12, stopped against inward axial movement by engagement with spokes as at 61 and extending in the direction of the disc 52, axially, sufficiently far to hold the central portion 62 of the disc away from the end of the hub 12.

The tubular element 60 is preferably made from transparent or at least from translucent material. One suitable material is transparent celluloid. The purpose of the tubular element 60 is two-fold, namely to stretch outwardly the disc 52 and to give it an externally convex shape and to prevent the formation of a shadow by the hub portion 12 from the light of a lamp 25, the tubular element 60 being transparent, light from the lamp 25 will flow therethrough and illuminate the disc 52 where otherwise a shadow would be formed by the hub portion 12.

The annulus 16 may be made to serve as a reflector for the lamps 21—21 by painting the surface thereof with white paint or by any other suitable well understood means.

To remove the cover upon the occasion of changing tires or wheels, it is only necessary to pull off the tread covering portion 51 by expanding the annulus 54, whereupon the portion 51 and portion 52 are completely detached. The tubular element 60 may be removed as will be obvious after the portion 52 is removed. Upon unfastening the hooks 46, the resilient elements 40 will release the annulus 16 and the lamps 21 secured thereto. The annulus 16 may then be withdrawn together with the lamps and the springs 40 attached to the annulus. The spring 29 may be released by compressing the hook portions 30 thereof and removed, and the lamp socket 26 may be removed from the clip 27, and when the wheel is removed from the head 3 in the usual manner, the hub may be telescopically removed over the lamp 25.

In replacing the parts above described, the reverse of the above described operation may be performed.

It will thus be seen that the entire device may be put together and taken apart with ease and convenience to remove it from one wheel and tire and replace it on another.

My invention is not limited to the exact details of construction shown and described. Many changes and modifications may be made within the scope and spirit of my invention without sacrificing its advantages.

I claim:

1. In combination with a wheel of the hollow hub type, a cover therefor, comprising an annular tread covering portion, a generally circular side portion of light transmitting material covering the side of the wheel and the tire thereon and joined at its periphery to the tread covering portion, the wheel being provided with means to support lamps externally and internally of the hub behind the side covering portion, and the side covering portion being spaced axially from the hub to prevent casting of shadows thereon by the hub.

2. In combination with a wheel of hollow hub type, a cover therefor and means to illuminate the cover, the cover comprising an annular tire tread covering portion, a generally circular side covering portion formed from light transmitting material, an annulus secured to the wheel on the opposite side from the side covering portion, an electric lamp secured to the annulus, a lamp disposed within the hub and supported centrally thereof, the lamps being positioned behind and adapted to illuminate the said side covering portion.

3. In combination, a wheel of the hollow hub type, a cover therefor comprising a generally circular disc of light transmitting material, a lamp mounted in the hub, a tubular element of relatively transparent shadow-proof material surrounding the lamp and serving as a spacer to axially space a central portion of the disc from the hub.

4. In an advertising device for automobile wheels and tires, a disc of light transmitting material disposed at the side of the wheel and tire, a tire tread covering portion joined to the disc and secured to the periphery of the tire, to support the disc, a base secured to the opposite side of the wheel from the disc and supporting a lamp between the base and the disc, to illuminate the disc interiorly, a lamp disposed centrally of the wheel, a tubular element of transparent material surrounding the centrally disposed lamp and outwardly distending the disc.

5. In combination with a wheel of the hollow hub type, a cover therefor comprising an annular tread covering portion and a generally circular side portion of light transmitting material covering the side of the wheel and the tire thereon and joined at its periphery to the said covering portion, the wheel being provided with means to support a lamp internally of the hub behind the side covering portion, and the side covering portion being spaced axially from the hub to prevent casting of shadows thereon by the hub.

6. In combination with a wheel having an outwardly projecting hub portion, a cover therefor comprising an annular tread covering portion and a generally circular side portion of light transmitting material covering the side of the wheel and the tire thereon and joined at its periphery to the tread covering portion, the wheel being provided with means to support a lamp externally of the hub and behind the side covering portion and the side covering portion being spaced axially from the hub to prevent casting of shadows thereon by the hub.

In testimony whereof I hereunto affix my signature this 27th day of October, 1931.

FRANZ HUND